Feb. 5, 1935.   J. J. GUEST ET AL   1,990,432
CUTTING OF SPIRAL BEVEL GEARS
Filed April 17, 1934   3 Sheets-Sheet 1
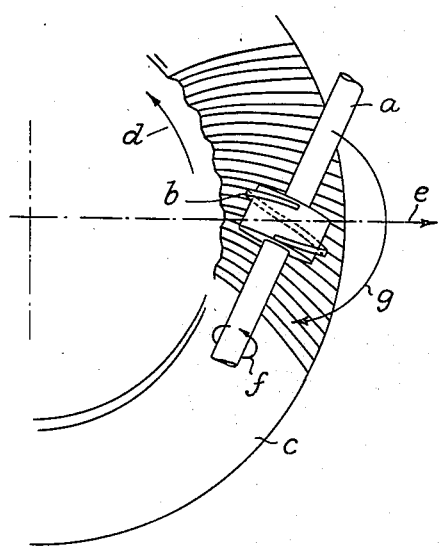
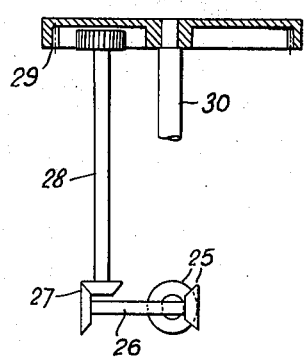
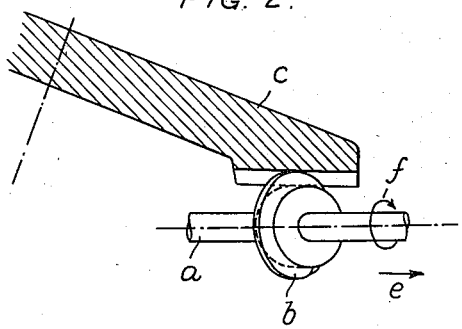
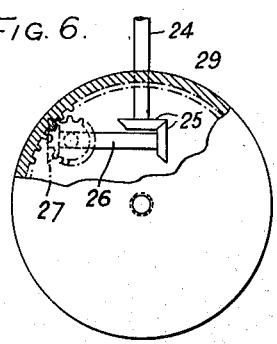
Inventors:
James John Guest and
Herbert Harry Wheatley, dec'd
by Barclays Bank Limited,
Lucy Dorothy Braybrook
and Amy Arnold, Executors
By   Norris & Bateman
ATTORNEYS

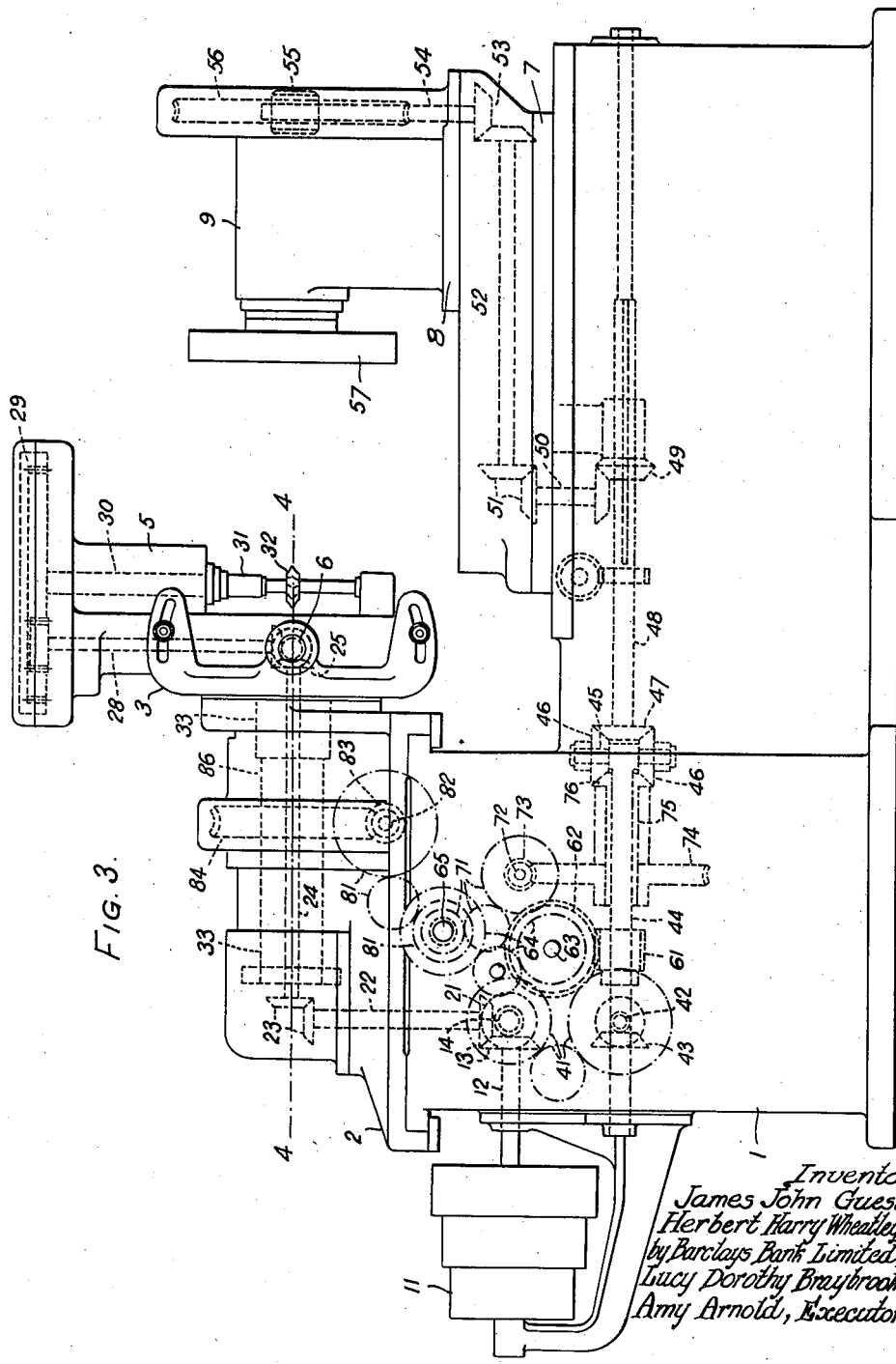

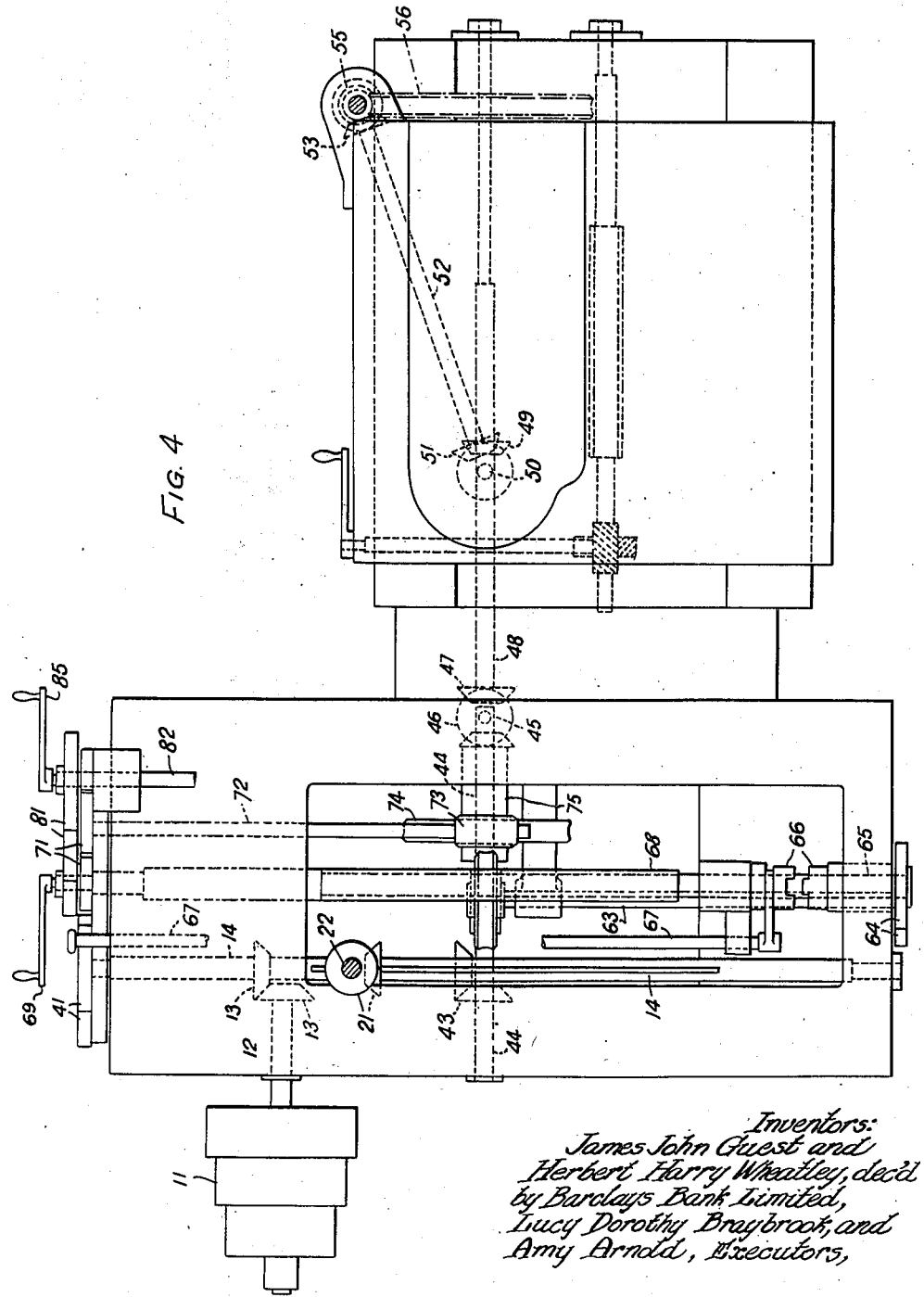

Patented Feb. 5, 1935

1,990,432

UNITED STATES PATENT OFFICE 1,990,432

CUTTING OF SPIRAL BEVEL GEARS

James John Guest, Abbey Wood, and Herbert Harry Wheatley, deceased, late of Banstead, England, by Barclays Bank Limited, London, England; Lucy Dorothy Braybrook Wheatley, St. Ives, and Amy Arnold, Bournemouth, England, executors Application April 17, 1934, Serial No. 721,056 In Great Britain August 16, 1932

5 Claims. (Cl. 90—4)

This invention relates to a method of and apparatus for cutting spiral gears.

According to the invention, a cutter or hob is employed of the kind described in the specifications of U. S. Letters Patent Nos. 1,649,631, 1,780,805 and 1,707,105 or of a kind similar thereto. This cutter or hob has teeth of a specially formed shape so that if the hob is used in a particular manner, a certain gear will be produced. The teeth are not straight sided as the process in which the hob is used is in the nature of a forming process and not a true generating process. To cut a spiral bevel gear, the hob and conical blank are so set up that the tangent to the helix at the central tooth of the hob lies along the tangent to the central spiral of the bottom of the tooth space of the bevel tooth to be cut in the blank, and as the cutting action takes place, the hob is given a straight line feed across the blank and at the same time is so twisted that this relative position is maintained or approximately maintained throughout the curve of the tooth.

The cutter and the blank should be rotated so that the cutter makes $n+k$ times the number of revolutions that the blank makes where $n$ is the ratio of the number of teeth of the bevel to the threads on the helix of the hob and $k$ is the allowance for the amount of spirality.

Preferably the hob has a single thread but it is desirable that a "lap" of a few teeth or partial teeth be made so that continuity of cut can be obtained and back lash thus eliminated.

The feed consists in a relative straight travel of the hob over the surface of the blank combined with an additional superposed rotation of the blank combined with an angular motion of the hob about a line perpendicular to the bevel gear cone containing the pitch of the teeth or an approximate cone. This angular motion of the hob is hereinafter referred to as the "twist". This feed is superposed upon the cutting motion.

All kinds of spiral may be cut, but curves other than straight lines and Archimedean spirals require a cam for the translational feed motion, whilst straight lines and Archimedean spirals can be produced conveniently by a screw feed.

It is sufficient for the twisting motion to be uniform as a small error in its accuracy is of no commercial importance, there being always a slight hobbing error except in the case of one particular curve. This twisting motion may, however, be produced by a cam.

In practice the setting up of the cutter may be modified by adjusting it to a curve on the pitch cone or on a cone through the lowest line of action of the teeth of the bevel when in use.

To enable the invention to be fully understood it will now be described with reference to the accompanying drawings in which:—

Figs. 1 and 2 are diagrammatic views at right angles to each other shewing the hob in position over the work and set to cut a spiral bevel gear.

Fig. 3 is a side elevation of a hobbing machine modified to cut a spiral bevel gear giving the motions to the work and hob indicated in Figs. 1 and 2, and Fig. 4 is a plan view thereof with certain parts removed.

Fig. 5 is a diagrammatic vertical section of part of the hob head to shew the drive and Fig. 6 is a plan view thereof.

Referring to Figs. 1 and 2, $a$ indicates the cutter shaft, $b$ the hob and $c$ the gear blank or work to be cut.

The direction of rotation of the work is indicated by the arrow $d$, the travel of the hob slide by the arrow $e$, the rotation of the hob by the arrow $f$ and the angular motion or twist applied to the hob by the arrow $g$. The hob $b$ and the blank $c$ are set up so that the tangent to the helix at the central tooth of the hob lies along the tangent to the central spiral of the bottom of the tooth space of the bevel at the pitch line of the tooth to be cut in the blank.

Thus the active cutting teeth of the hob, which are near the centre of the broken lines indicating the underlying teeth in Fig. 1, lie along the channel of the bevel gear spiral teeth.

Figs. 3–6 show a hobbing machine suitable for carrying out the invention. As shown the machine comprises a base 1 carrying the main slide 2 which supports the headstock bracket 3, the latter being mounted in bearings 33 in the main slide 2 so that it is adapted to be turned about the horizontal axis 4. The hob head 5 is mounted on the bracket 3 and is adjustable about the transverse axis 6. The hob head 5 carries the arbor 31 on which the cutter 32 is mounted.

The work head 9 is mounted on a swivel plate 8 carried by a cross slide 7, the work being secured to a face plate 57.

The main drive of the machine is transmitted from the cone pulley 11 (or a pulley and gear box may be substituted) through shaft 12, to bevels 13 to the main driving shaft 14.

The hob 32 is driven from the main shaft 14 through bevels 21, vertical shaft 22, bevels 23, shaft 24, bevels 25, cross-shaft 26, bevels 27, vertical shaft 28, the latter being geared by internal gearing 29 to the cutter spindle 30 which carries the arbor 31 with the hob 32.

The face plate 57 carrying the work is driven from the main shaft 14 through change speed gearing 41, driving shaft 42, fixed bevels 43, transverse shaft 44 on which differential bevels 46 carried by the cross pin 45 secured to the shaft are mounted, and which gears 46 with a bevel 47 on transverse shaft 48, through bevels 49, vertical shaft 50 and bevels 51 drive the horizontal work head shaft 52. The drive is then transmitted through bevels 53 to a worm shaft 54 carrying a worm 55 which drives a worm wheel 56 on the work spindle (not shown) which carries the face plate 57.

The change gears 41 are selected so that the hob makes $n$ times as many revolutions as the blank where $n$ is the number of teeth in the gear to be cut, and the hob is a single start.

In operation, as the hob is fed across the face of the blank by the movement of the slide 2, an additional movement is given the rotation of the blank to correspond to the spirality of the bevel gear being cut, and also the hob 32 is twisted about the axis 4 by rotating the headstock bracket 3.

In operation, the slide 2 is traversed, the hob is driven and the work is rotated while at the same time a twist is applied to the hob by rotating the headstock bracket 3 about the axis 4.

The slide 2 is traversed as follows:—Shaft 44 carries a worm 61 driving a worm wheel 62 on the transverse feed shaft 63 which through change speed gears 64, clutch shaft 65, and clutch 66 drives the main feed screw 68 supported in the frame of the machine and working in a nut fixed to the slide 2. The clutch 66 is operated by the clutch rod 67 through the handle at the end of the machine.

The angular motion of the work necessary to produce the desired spiral is obtained by means of the change speed gearing 71 which superposes a motion on the work driving shaft 48. The change speed gearing 71 connects the main screw 68 to the shaft 72 which carries a worm 73 engaging a worm wheel 74 mounted on a hollow shaft 75 carrying a differential bevel gear 76 which engages the differential bevels 46. The change speed gearing 71 is selected to give the desired angular motion according to the desired spiral.

In addition to the foregoing motion, a twist is imparted to the hob as follows:—The change speed gear 81, selected to give the desired twist, connects the main screw to the shaft 82 carrying a worm 83 driving a worm wheel 84 carried on the spindle 86 of the head stock bracket 3 as shewn. The bracket 3, carrying the hob head and cutter is thus rotated about the axis 4.

The change gears are selected so that the hob spindle is so twisted as the cutter is traversed across the blank as to make the tangent to the hob teeth continue to lie along the tangent to the teeth of the spiral bevel gear although the angle which this tangent makes with the bevel radius changes during the motion. The gears do this with sufficient accuracy for practice.

In setting up the machine, after the gears have all been arranged, the clutch 66 is thrown out and the hob is adjusted by handle 69 to a selected position relative to the blank at which the angle of the spiral of the tooth has been determined. A gear of train 81 is then slipped out and by use of handle 85 the headstock bracket 3 is rotationally adjusted until the hob thread lies along the calculated line and the gear is then slipped in.

The use of the angular adjustment of the head 5 about the axis 6 is to secure the best form of hob tooth; this adjustment is locked during the cutting operation.

What is claimed is—

1. A method of cutting spiral bevel gears which consists in employing a hob having formed teeth to cut a particular gear, setting up the hob and the conical blank to be cut so that the tangent to the helix at the central tooth of the hob lies along the tangent to the central spiral of the bottom of the tooth space of the bevel at the pitch line of the tooth to be cut in the blank, and then rotating the hob and the blank and moving the hob across the blank in a straight line and at the same time superposing an angular motion on the blank necessary to produce the desired spiral and also an angular movement or twist on the hob about an axis passing through the hob axis so that the aforementioned relative position between the hob and the blank is maintained or approximately maintained throughout the curve of the tooth.

2. A method of cutting spiral bevel gears according to claim 1 wherein the hob and the blank are rotated so that the hob makes $n+k$ times the number of revolutions that the blank makes where $n$ is the ratio of the number of teeth of the bevel to the threads on the helix of the hob and $k$ is the allowance for the amount of spirality.

3. A hobbing machine for cutting spiral bevel gears comprising driving means having mechanism for rotating a hob and traversing the hob across a blank in a straight line, means for rotating the blank, means for applying an angular motion or twist on the hob about an axis passing through the hob axis, and means for superposing an angular motion on the blank to produce the desired spiral.

4. A hobbing machine according to claim 3 having a head for the hob, a bracket carrying said head, and said driving means having change speed gearing to turn the bracket about its central axis.

5. A hobbing machine according to claim 3 having a head for the hob, a bracket carrying said head, a shaft carrying said bracket, a slide in which the shaft is journaled, and gearing to operate the shaft from the driving means.

JAMES JOHN GUEST,
BARCLAYS BANK LIMITED,
By HUGH CARROLL,
*Assistant Secretary.*
LUCY DOROTHY
BRAYBROOK WHEATLEY,
AMY ARNOLD,
*Executors of the Estate of Herbert Harry Wheatley, Deceased.*